J. A. GEROME.
TIRE.
APPLICATION FILED JULY 31, 1920.
1,412,682. Patented Apr. 11, 1922.
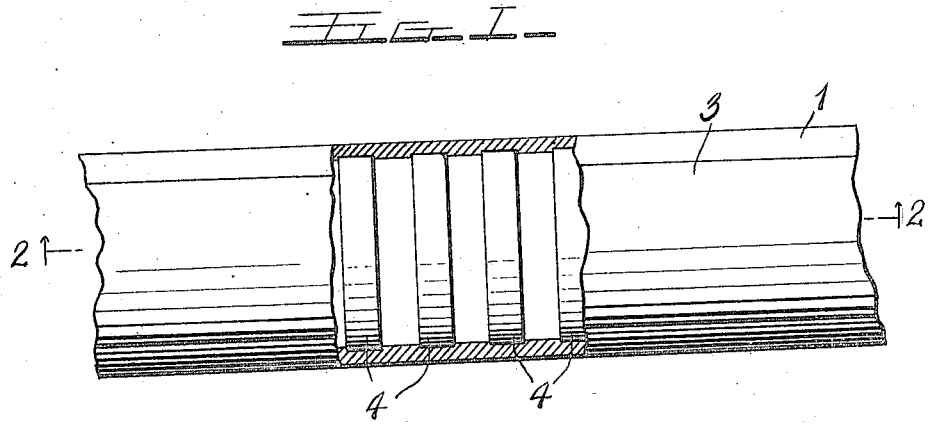
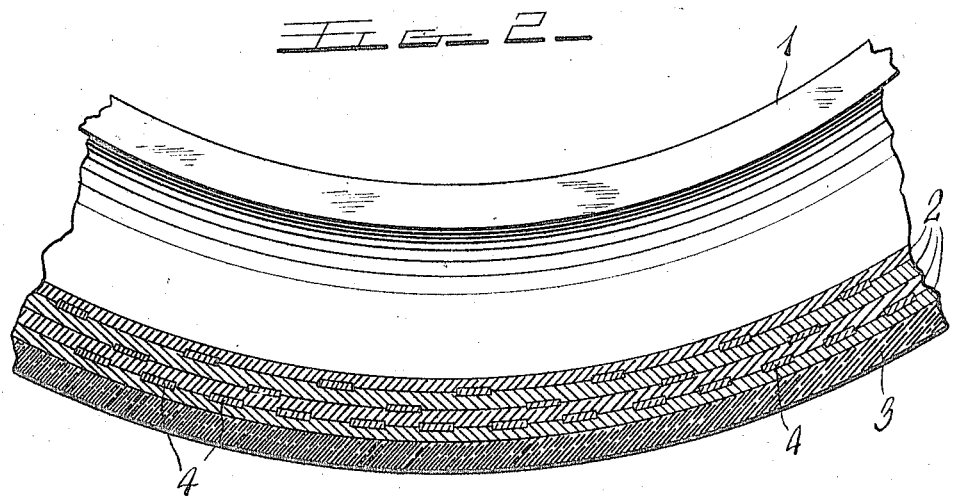
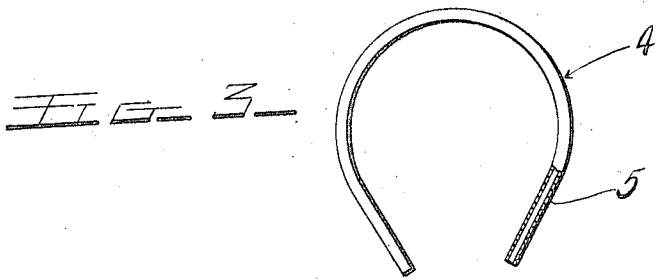
John Alfred Gerome
INVENTOR
BY Victor J. Evans
ATTORNEY
WITNESS: J. R. Hoge

UNITED STATES PATENT OFFICE.

JOHN ALFRED GEROME, OF KITCHENER, ONTARIO, CANADA.

TIRE.

1,412,682.     Specification of Letters Patent.     Patented Apr. 11, 1922.

Application filed July 31, 1920. Serial No. 400,561.

*To all whom it may concern:*

Be it known that I, JOHN ALFRED GEROME, a citizen of the Republic of Switzerland, residing at Kitchener, in the Province of Ontario and Dominion of Canada, have invented new and useful Improvements in Tires, of which the following is a specification.

This invention relates to an improvement in tires for automobiles and the like, the principal object of the invention being to insert springs in the tire for preventing collapsing of the same under the load and also preventing cutting of the tire.

Another object of the invention is to place the springs between the plies of fabric of the tire with spaces between the springs of each annular row.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a fragmentary view of a tire constructed in accordance with my invention and having portions broken away to show the interior construction thereof.

Figure 2 is a section on line 2—2 of Figure 1, taken circumferentially of the tire.

Figure 3 is a view of one of the springs.

In these views 1 indicates the tire casing which may be formed in the usual manner and is composed of a number of plies 2 of rubberized fabric and the rubber tread 3. In carrying out my invention I place springs 4 between the plies, each spring being formed of the same cross sectional shape as the tire, as shown in Figure 3.

The tire is built in the ordinary way but after the first ply of rubberized fabric is put on the core and rolled down an annular row of steel springs 4 is placed in position on this fabric. Each spring is contained within a rubber jacket 5. These springs are spaced apart as shown. These springs must be long enough to come down against the inner edge of the core. Then the second ply of material is placed in position over the first ply and the springs and then a second row of springs, contained in rubber jackets, is placed over the second ply. These springs are alternately arranged with the springs of the first row. The third ply of fabric is then placed in position over the second row of springs and then a third row of springs is placed on this third ply with the springs located above the spaces between the springs of the other two rows. The springs of the outer row are spaced apart a distance equal to the width of the spring and the springs of the inner rows are arranged in radial alignment with such spaces, as clearly shown in Figure 2. Thus a sharp object cannot be forced through the tire without striking one of the springs. The fourth ply of material is then put in position and rolled down and the rest of the tire built up the same as usual. All the springs must be long enough to come down against the inner edge of the core and if desired a greater number of plies of fabric may be used and also a greater number of rows of springs may be used.

The springs will prevent collapsing of the tire so that the tire may be used without an inner tube, though, of course, a tube can be used if desired and in this case the springs would act as an armor and prevent punctures or blowouts of the tube.

As will be seen the springs will act to carry the load in a resilient manner and will add greatly to the life of the tire.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A tire casing formed with a number of plies of fabric, a row of metal springs placed between each pair of plies, a jacket of resilient material enclosing each spring, the springs of the outer row being spaced apart a distance equal to the width of a spring and the springs of the inner rows being arranged in radial alignment with said spaces.

In testimony whereof I affix my signature.

JOHN ALFRED GEROME.